May 5, 1936.   L. E. KLUMP   2,039,804
ATTACHING STRIP FOR ADVERTISING MATTER
Filed Oct. 13, 1934
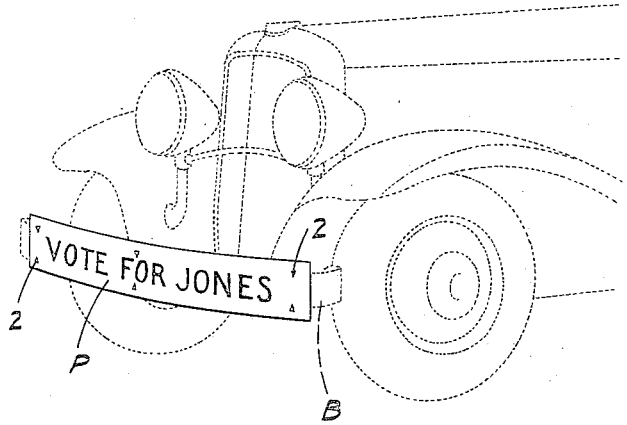
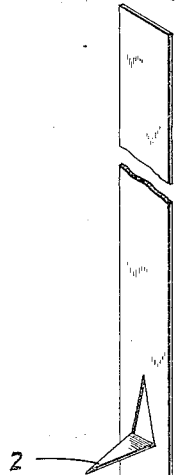
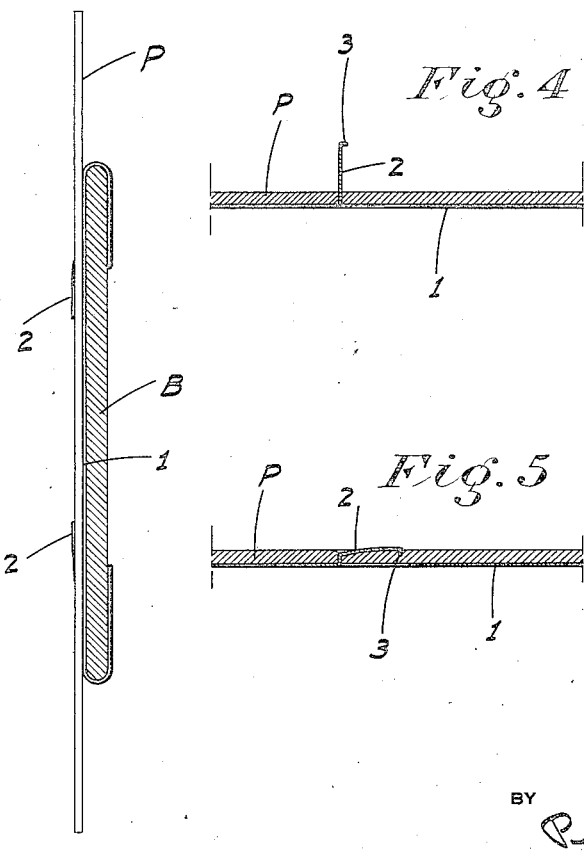
INVENTOR
*L. E. Klump*
BY
ATTORNEY Patented May 5, 1936

2,039,804

UNITED STATES PATENT OFFICE 2,039,804

ATTACHING STRIP FOR ADVERTISING MATTER

Laurence E. Klump, Stockton, Calif.

Application October 13, 1934, Serial No. 748,159

3 Claims. (Cl. 40—129)

This invention relates generally to an attaching strip for advertising matter and is directed particularly to a metal attaching strip for securing an advertising placard to the bumper of an automobile, a popular place of advertising display at the present time.

The principal object of my invention is to provide an attaching strip for securing an advertising placard to an automobile bumper which strip may be readily engaged with the bumper and fastened intermediate its ends to the advertising placard. It is my purpose to provide the attaching strip with a placard securing element which will not tear away from the placard due to the vibration of the automobile or the blast of wind created by the motion of the automobile.

A further object of my invention is to provide a metal attaching strip which is provided with means to attach the advertising placard to the metal attaching strip without the use of special punches, rivets and washers or other impractical or expensive securing devices.

An additional object is to provide an attaching strip which may be quickly attached in combination with the placard to the bumper of an automobile regardless of the width of the bumper or its general contour and without the use of tools, bolts, brackets or wires, all of which would make this character of advertising medium very inconvenient and impractical.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a perspective view illustrating the advertising placard secured to an automobile bumper by means of my improved metal attaching strip.

Figure 2 is a foreshortened perspective view of the metal attaching strip as initially formed prior to use.

Figure 3 is an end view of the advertising card and attaching strip as attached to a bumper, the latter being shown in section.

Figure 4 is a fragmentary longitudinal section illustrating the clamping prong inserted through the advertising placard and a sharp burr formed on the end of said prong as the latter is being bent down to engage the placard.

Figure 5 is a similar view illustrating the clamping prong as bent over and the sharp burr driven into the placard.

Referring now more particularly to the characters of reference on the drawing, the numeral 1 indicates the metal attaching strip preferably formed from box strapping steel, approximately .015 of an inch in thickness, and ½ inch wide. This material is relatively stiff, yet bendable, but of a non-resilient nature. The strip is of a length greater than the height of any bumper so that said strip may extend up the front of the bumper and be bent at both ends behind the bumper as shown in Figure 3. Formed intermediate the ends of the metal strip 1 and die stamped therefrom are a plurality of substantially triangular relatively long clamping prongs 2 all disposed in that portion of the attaching strip which will lie in front of the bumper. These prongs 2 are die stamped with a die that will form an exceedingly sharp point on said prongs as well as cut the edges clean and without ragged portions. The prongs are initially bent out so as to extend at right angles to the strip.

The attaching strips 1, usually three in number, are secured to the advertising placard P as follows:

Sharp prongs 2 are pushed through the placard P as shown in Figure 4 and a small burr 3 is then formed on the end of each clamping prong 2 by merely turning or bending over the sharp point of said prong with a hammer or like tool. The prong 2 is then bent down firmly against the face of the placard securing the same firmly between said prong and attaching strip 1. This drives the burr 3 into the placard as shown in Figure 5 which further secures the placard P and attaching strip together and prevents the prong 2 from tearing away from the placard.

In the aforementioned manner three or more attaching strips are secured in vertical spaced relation to the placard P. To attach the placard by means of the attaching strip 1 to an automobile bumper B it is only necessary to place the placard in longitudinal position along the front of the bumper with the attaching strips contacting the bumper B and then to bend the upper and lower ends of each strip over the bumper and to firmly clamp them to the bumper B as shown in Figure 3.

The attaching strips 1 are formed of steel which does not have a high carbon content, thereby making it possible to readily bend the strips without breaking and their non-resilient nature insures the prongs and bent over portions behind the bumper of retaining their bent portions without the use of additional holding means.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In combination, a puncturable and compressible advertising placard, a plurality of bendable metal strips disposed against one face of the placard, prongs formed on the strips and projecting through the card, said prongs being bent down against the other face of the placard, and burrs on the ends of the prongs penetrating the surface of said other face.

2. That method of securing an attaching strip to an advertising placard comprising the steps of forming a relatively sharp prong on the strip, passing the prong through the placard, bending over the point of the prong to form a burr and then bending the prong over until the prong lies against the surface of the placard and the burr penetrates said surface.

3. In combination, a puncturable and compressible advertising card, a metal strip disposed against one face of the placard, a prong formed on the strip and projecting through the card, said prong being bent down against the other face of the placard, and a burr on the end of the prong penetrating the surface of said other face.

LAURENCE E. KLUMP.